(12) United States Patent
Wang et al.

(10) Patent No.: US 10,515,052 B2
(45) Date of Patent: Dec. 24, 2019

(54) FILE SYSTEM THAT SUPPORTS BOTH CASE SENSITIVE AND CASE INSENSITIVE DIRECTORY LOOKUP

(71) Applicant: VMware, Inc., Palo Alto, CA (US)

(72) Inventors: Wenguang Wang, Santa Clara, CA (US); Richard P Spillane, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 232 days.

(21) Appl. No.: 15/655,218

(22) Filed: Jul. 20, 2017

(65) Prior Publication Data

US 2019/0026301 A1    Jan. 24, 2019

(51) Int. Cl.
*G06F 16/14* (2019.01)

(52) U.S. Cl.
CPC .................. *G06F 16/152* (2019.01)

(58) Field of Classification Search
CPC ........ G06F 16/152; G06F 16/13; G06F 16/14; G06F 16/148; G06F 17/30; G06F 7/00
See application file for complete search history.

(56) References Cited

U.S. PATENT DOCUMENTS

| | | | | |
|---|---|---|---|---|
| 5,388,257 A * | 2/1995 | Bauer | ................. | G06F 16/1794 707/741 |
| 5,884,309 A * | 3/1999 | Vanechanos, Jr. | ..... | G06Q 10/10 |
| 6,292,802 B1 * | 9/2001 | Kessenich | ............. | G06F 16/951 |
| 6,389,427 B1 * | 5/2002 | Faulkner | ................. | G06F 16/16 707/741 |
| 8,429,341 B2 * | 4/2013 | Kazar | .................... | G06F 16/13 711/112 |
| 2005/0222983 A1 * | 10/2005 | Schwedes | ........... | G06F 17/2735 |
| 2006/0200465 A1 * | 9/2006 | Chuang | ................. | G06F 16/148 |
| 2015/0135331 A1 * | 5/2015 | Das | ..................... | G06F 21/6218 726/27 |
| 2015/0154171 A1 * | 6/2015 | Jensen | .................. | G06F 17/243 715/224 |
| 2015/0227535 A1 * | 8/2015 | Avati | ..................... | G06F 16/166 707/741 |
| 2015/0324386 A1 * | 11/2015 | Calder | ................ | H04L 67/1097 707/649 |

* cited by examiner

*Primary Examiner* — Giovanna B Colan

(57) ABSTRACT

A file system stores directories and files in a file system directory that uses case sensitive names. The same file system directory can support directory and file name lookups that treat the directory and file names in a case sensitive manner or in a case insensitive manner. The search criteria used for the lookup can be based on case-folding the name to produce a case-neutral name and on the original name with its case preserved. Search criteria can be generated for a case sensitive name lookup or for a case insensitive name lookup on the same file system directory, thus avoiding having to support separate file systems or separate file system directories for case sensitive and case insensitive file access.

17 Claims, 10 Drawing Sheets key: < inode, hash1 (case-folded file object name), hash2 (original file object name), collision index > ← 622 parent inode 702 | first hash value, 704 | second hash value, 706 | collision index, 708

Fig. 7 key ("userA"): < 534, hash1 ("usera"), hash2 ("userA"), 0 >
                           702      704 (case-folded – all lower case)  706   708

Fig. 7A key ("userA"): < 534, hash1 ("USERA"), hash2 ("userA"), 0 >
                           702      704 (case-folded – all upper case)  706   708

Fig. 7B

FILE SYSTEM THAT SUPPORTS BOTH CASE SENSITIVE AND CASE INSENSITIVE DIRECTORY LOOKUP

BACKGROUND

The names of file objects, such as directories and files, in a file system can be referenced in a case sensitive (CS) manner or case insensitive (CI) manner. Case sensitivity refers to whether or not the combination of upper and lower case letters that constitute the name of the file object is significant. Case sensitivity applies to languages that have case-sensitive alphabetic characters, including but not limited to the Latin alphabet, Greek alphabet, Cyrillic alphabet, and so on. For example, in a case sensitive context, the name "FooBar" is different from the name "fooBar". In a case insensitive context, "Foo_Bar", "foo_Bar", or any other combination of upper and lower cases of the letters are all deemed to be equivalent or the same. This last example further illustrates that case sensitivity does not apply to non-alphabetic characters, such as underscore (_), dollar sign ($), ampersand (&), and so on.

Some file systems, such as ext4 and btrfs, support only case sensitive (CS) lookup of file objects (files, directories). Some file systems such as HFS+ can support either CS lookup or CI lookup, but not at the same time. The HFS+ volume has to be formatted as either a CS file system or a CI file system. In order to change the case sensitivity of the file system, the HFS+ volume would have to be erased and reformatted, which in a live system is not possible as a practical matter since the resulting complete disruption of service is not likely to be tolerated.

Some file systems, such as NTFS and HFS+, support case insensitive (CI) lookup with case preserving (CP) semantics where file objects can be created using mixed upper and lower case letters but can only be retrieved in a case insensitive manner. For example, suppose a file called "FooBar" is created. The file will be stored with the case of its file name preserved; in this case, "FooBar." For example, a listing of the directory will show "FooBar." However, the file can be accessed (e.g., for reading or writing) in a CI manner using any combination of upper and lower case letters (case insensitive lookup); for example, "foobar", "FOObar", "fooBAR", and so on all can be used to access the file. Case preserving semantics also allows the file to be renamed (e.g., to "fOObAR") to change the name on-disk, but still be accessed in a CI manner.

Nonetheless, there are use cases where both CS and CI capabilities are needed on the same volume. Some file services provide a unified stack supporting both a service message block (SMB) based file system and a network file system (NFS). If the underlying file system can only support one type of case sensitivity, that can make file lookups using the other case sensitivity very slow. For example, the Samba™ file server (a popular open source SMB type of server) supports CI lookups on an ext4 file system, but ext4 only provides CS lookups on disk. The Samba™ file server must read the whole file system directory of the ext4 file system into memory in order to perform a CI lookup, which can be slow and memory intensive for large file systems and may be impractical, or even impossible, for very large file systems.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 7 illustrates the elements of a key in accordance with the present disclosure.

FIGS. 7A and 7B illustrate examples of keys in accordance with the present disclosure.

DETAILED DESCRIPTION

The present disclosure describes techniques to provide a file system on a storage volume that supports both case sensitive and case insensitive access to directories and files (collectively referred to as file objects) for users of the file system. Embodiments in accordance with the present disclosure, provide a file system directory that indexes directories and files using a combination the original name of the file object with its case preserved and a case-neutral version of the file object's name. Embodiments in accordance with the present disclosure further include processing requests for file objects according to whether the access is a case sensitive access or a case insensitive access. The techniques in accordance with the present disclosure described herein avoid time-consuming and memory intensive processing that is required for dual-case access in conventional file systems by providing a single file system directory that can support both case sensitive and case insensitive lookups. Techniques in accordance with the present disclosure can provide dual case sensitive support in very large file systems (e.g., millions of files), which may not be practical in conventional file systems that provide dual case sensitive access.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
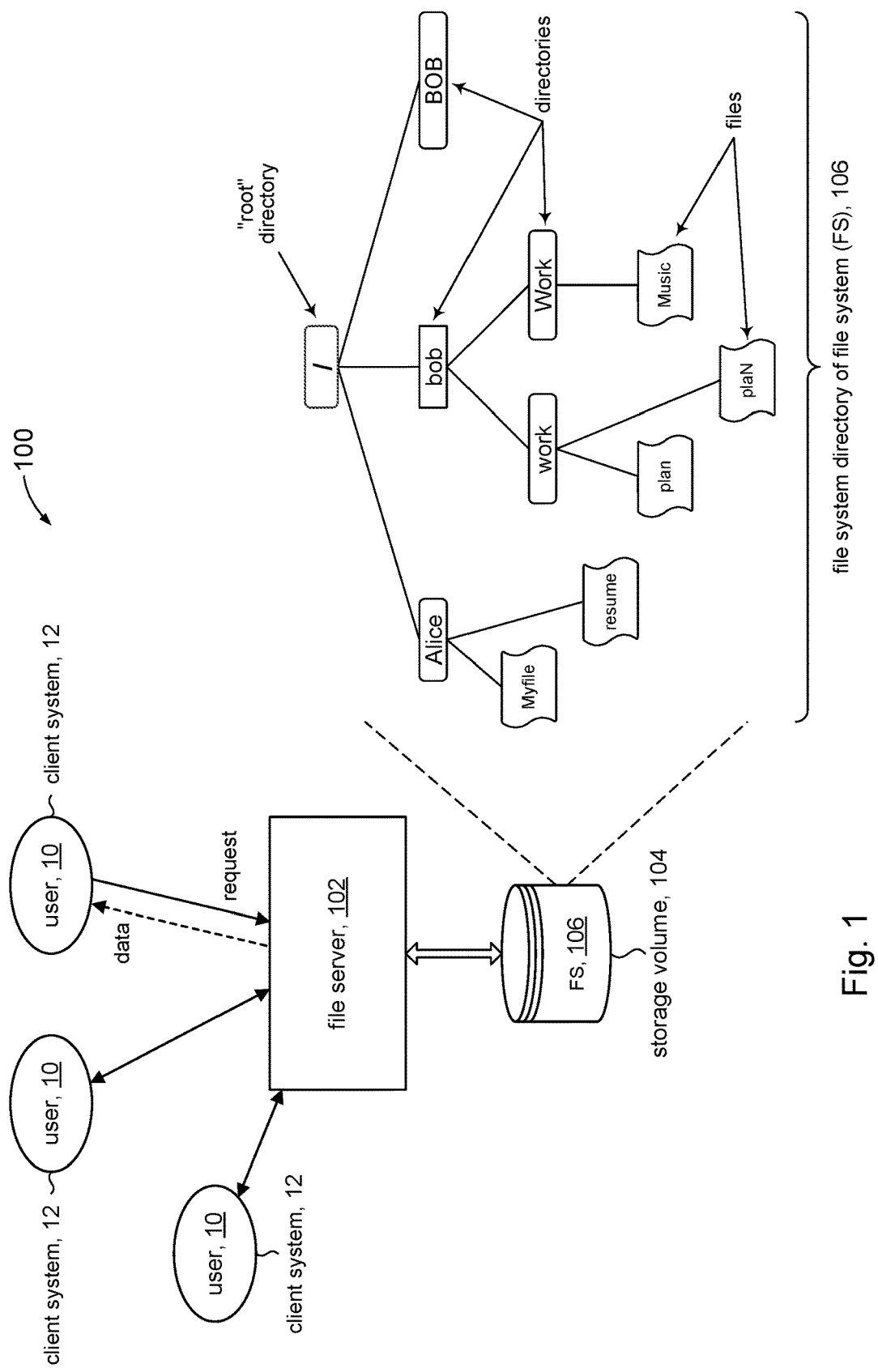
FIG. 1 illustrates a system-level diagram of a file system in accordance with the present disclosure.

FIG. 1 shows a simplified diagrammatic illustration of a system 100 in accordance with some embodiments of the present disclosure. The system 100 can include a file server 102. The file server 102 can service requests from client systems 12 to provide file services for users 10.

The system 100 can include a storage volume 104 that is in communication with and accessed by the file server 102. The storage volume 104 can be any type or form of storage device or medium capable of storing data and/or computer-readable instructions. For example, storage volume 104 may be a magnetic disk drive (e.g., a so-called hard drive), a solid state drive, a floppy disk drive, a magnetic tape drive, an optical disk drive, a flash drive, or the like.

A file system 106 in accordance with the present disclosure can be defined on the storage volume 104. FIG. 1 shows the file system directory, which represents the logical arrangement of directories and files that comprise file system 106. Note that the directory names and the file names are case sensitive. As such, the root directory can include a directory called "bob" and another directory of the same name but spelled differently, "BOB". Likewise, the directory "/bob/work" can include two files having the same name, but spelled with different cases, namely "plan" and "plaN."

In accordance with the present disclosure, some users 10 can access file objects in file system 106 in a case sensitive manner, while at the same time other users 10 can access other file objects in a case insensitive manner. In some embodiments, for example, the file server 102 can expose an interface comprising file operations that include a parameter to specify whether the operation is case sensitive (CS) or case insensitive (CI). For example, the function calls:

file-op (CS, object-name, <zero or more additional parameters>)
file-op (CI, object-name, <zero or more additional parameters>)

can be used to access a file object identified in the name parameter object-name that treats the name parameter as a case sensitive (CS) name or as a case insensitive (CI) name. In other embodiments, the file server 102 interface can provide an API comprising separate sets of case sensitive and case insensitive function calls, for example:

CS_file-op (object-name, <zero or more params>)
CI_file-op (object-name, <zero or more params>)

In some embodiments, a plugin can be provided. For example, a plugin can be used to perform a case insensitive operation on a file server that supports case sensitive file names when the file server provides special extended attribute functionality. In some embodiments, for example, the following fragment of code can be used to do a CI lookup of file object on a CS file server that has the file name "Hello":

cs_name=getxattr(dir, "user.sys.caseinsensitive.hELlo");
if (strlen(cs_ame)==0) {return ENOENT; }
file-op(dir, cs_name);

where dir is a pointer to a directory that contains the file of interest (i.e., "Hello"), getxattr( ) is a POSIX API (portable operating system interface, application programming interface) plugin for accessing extended attribute information in a directory, "user.sys.caseinsensitive." specifies the specific extended attribute, cs_name will point to the CS version of the name "hELlo" in the CS file server, file-op( ) is a desired operation on the file system (e.g., stat, Istat, open, etc.).

The getxattr( ) function call can return "Hello" for any combination of cases used to spell the file name (e.g., "hellO", "hello", "hELlo" in the example above, and so on), so that the subsequent file operation can access the file as it is stored on the file server. If it returns an empty string " ", it means the requested name is not in the directory.

Figure 2:
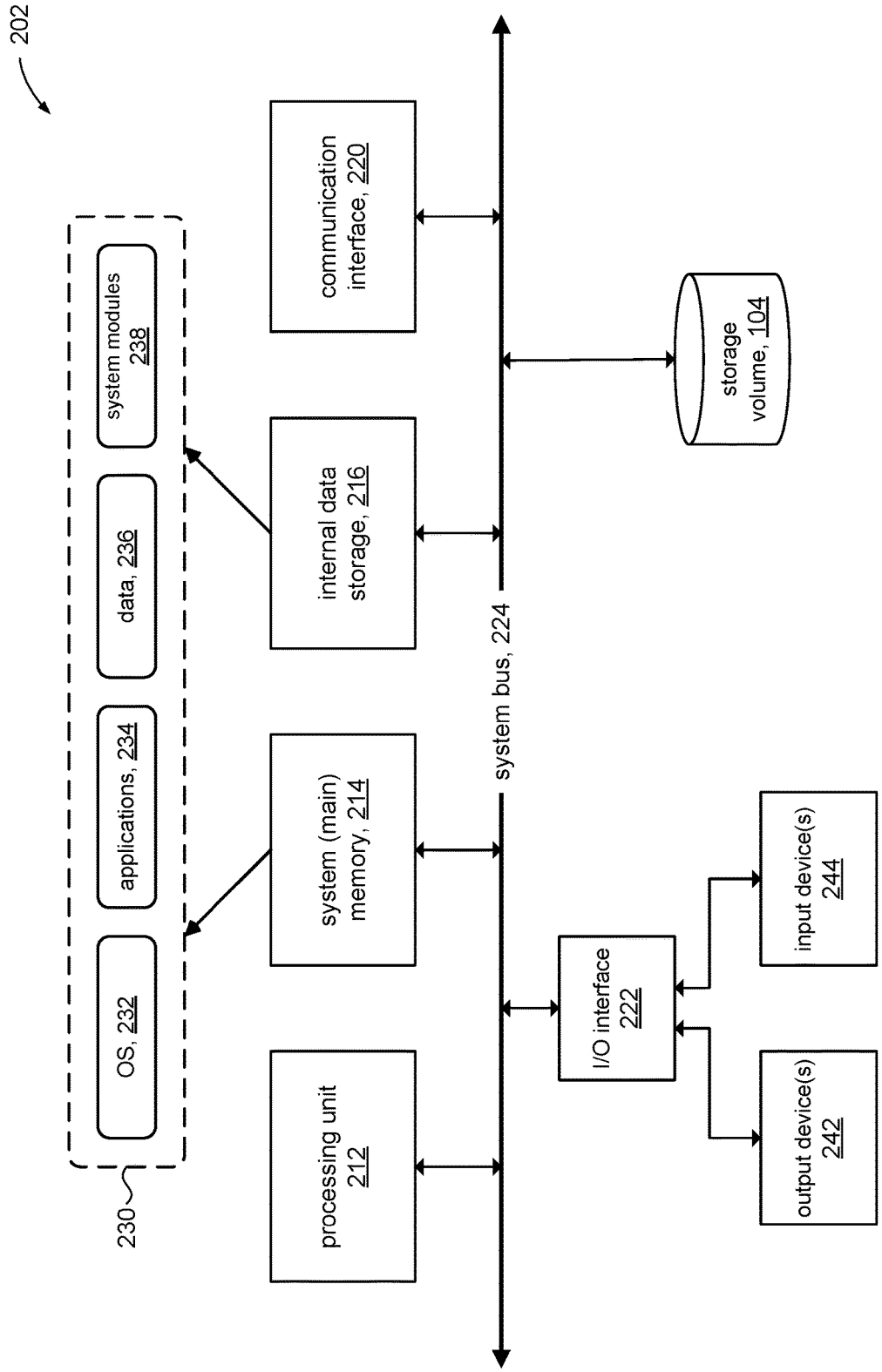
FIG. 2 is a high level diagram of a computing system in accordance with aspects of the present disclosure.

FIG. 2 is a simplified block diagram of an illustrative computing system 202 for implementing one or more of the embodiments described herein. For example, the computing system 202 can perform and/or be a means for performing, either alone or in combination with other elements, operations of file server 102 in accordance with the present disclosure. Computing system 202 can also perform and/or be a means for performing any other steps, methods, or processes described herein.

Computing system 202 can include any single or multi-processor computing device or system capable of executing computer-readable instructions. In a basic configuration, computing system 202 can include at least one processing unit 212 and a system (main) memory 214.

Processing unit 212 can comprise any type or form of processing logic capable of processing data or interpreting and executing instructions. The processing unit 212 can be a single processor configuration in some embodiments, and in other embodiments can be a multi-processor architecture comprising one or more computer processors. In some embodiments, processing unit 212 may receive instructions from program and data modules 230. These instructions can cause processing unit 212 to perform operations and processing in accordance with the present disclosure.

System memory 214 (sometimes referred to as main memory) can be any type or form of volatile or non-volatile storage device or medium capable of storing data and/or other computer-readable instructions. Examples of system memory 214 include, for example, random access memory (RAM), read only memory (ROM), flash memory, or any other suitable memory device. Although not required, in some embodiments computing system 202 may include both a volatile memory unit (such as, for example, system memory 214) and a non-volatile storage device (e.g., data storage 216, 246).

In some embodiments, computing system 202 may also include one or more components or elements in addition to processing unit 212 and system memory 214. For example, as illustrated in FIG. 2, computing system 202 may include internal data storage 216, a communication interface 220, and an I/O interface 222 interconnected via a system bus 224. System bus 224 can include any type or form of infrastructure capable of facilitating communication between one or more components comprising computing system 202. Examples of system bus 224 include, for example, a communication bus (such as an ISA, PCI, PCIe, or similar bus) and a network.

Internal data storage 216 may comprise non-transitory computer-readable storage media to provide nonvolatile storage of data, data structures, computer-executable instructions, and so forth to operate computing system 202 in accordance with the present disclosure. For instance, the internal data storage 216 may store various program and data modules 218, including for example, operating system 232, one or more application programs 234, program data 236, and other program/system modules 238.

Communication interface 220 can include any type or form of communication device or adapter capable of facilitating communication between computing system 202 and one or more additional devices. For example, in some embodiments communication interface 220 may facilitate communication between computing system 202 and client systems 12 to provide file services for users 10. Examples of communication interface 220 include, for example, a wired network interface (such as a network interface card), a wireless network interface (such as a wireless network interface card), a modem, and any other suitable interface.

In some embodiments, communication interface 220 may also represent a host adapter configured to facilitate communication between computing system 202 and one or more additional network or storage devices, such as storage volume 104, via an external bus or communications channel. Examples of host adapters include, for example, SCSI host adapters, USB host adapters, IEEE 1394 host adapters, SATA and eSATA host adapters, ATA and PATA host adapters, Fibre Channel interface adapters, Ethernet adapters, or the like.

Computing system 202 may also include at least one output device 242 (e.g., a display) coupled to system bus 224 via I/O interface 222, for example, to facilitate I/O with a system administrator. The output device 242 can include any type or form of device capable of visual and/or audio presentation of information received from I/O interface 222.

Computing system 202 may also include at least one input device 244 coupled to system bus 224 via I/O interface 222, for example, to facilitate I/O with a system administrator. Input device 244 can include any type or form of input device capable of providing input, either computer or human generated, to computing system 202. Examples of input device 244 include, for example, a keyboard, a pointing device, a speech recognition device, or any other input device.

Figure 3:
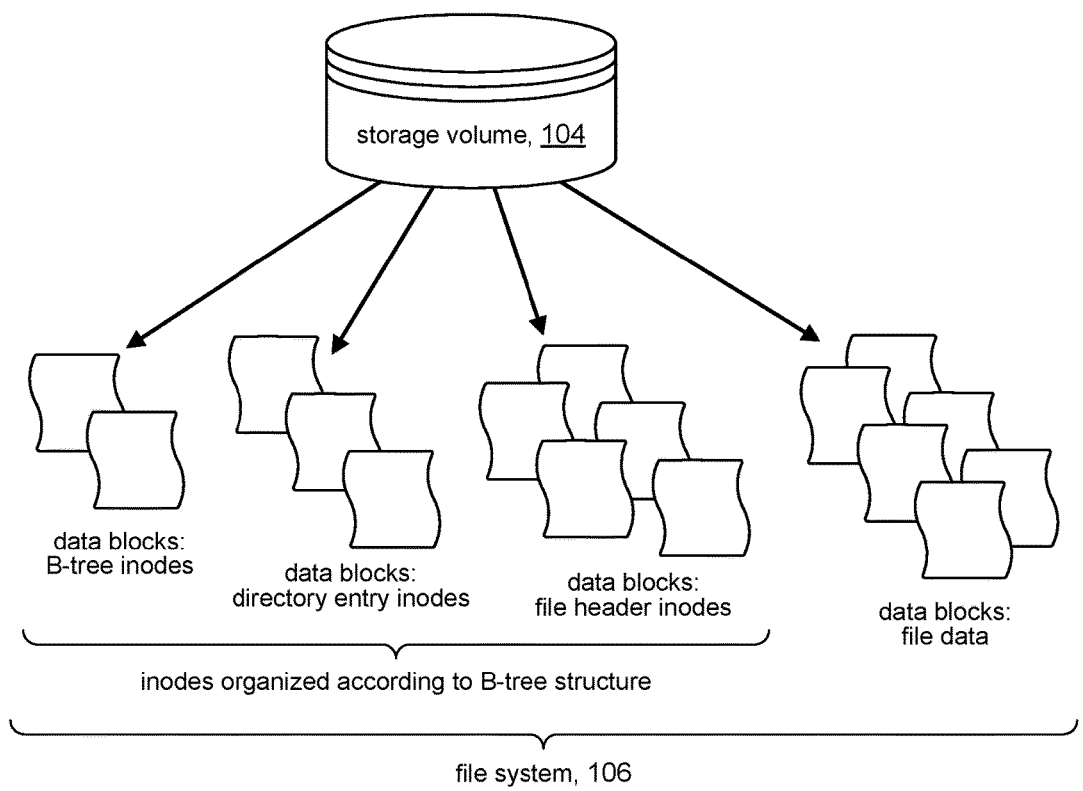
FIG. 3 illustrates an organization of data blocks on a storage volume of the present disclosure.

FIG. 3 illustrates in some embodiments, that storage on storage volume 104 can be organized into fixed-sized data blocks of a given block size; e.g., 1 KB, 4 KB, etc. Most of the data blocks are used to store the file data (i.e., the file contents) that comprise the files in file system 106. A portion of the data blocks (referred to as inodes) can be used to store the file system directory of file system 106, which is the hierarchical arrangement of directories and files that comprise the file system 106. More specifically, the file system directory can be represented as a sorted index of the names of the directories and files that comprise file system 106. In some embodiments, for example, the indices of the directories and files can be sorted in B-tree sorting order and stored in a B$^+$-tree data structure. More generally, the file system directory can be represented using any suitable tree data structure including for example, but not limited to, a log-structure merge (LSM) tree and the like. The B$^+$-tree structure provides very high fanout (i.e., the number of pointers to child nodes from a node), which reduces the number of I/O operations required to find an element in the tree, and is thus an efficient data structure for a file system directory.

The portion of data blocks of the storage volume 104 that are designated as inodes can be identified by an inode number (also referred to as inode#). The inode number is associated with or otherwise mapped to an address of a data block on the storage volume 104 that contains the information stored by the inode. Some inodes can be used to store that data that represent the nodes and links that comprise the B$^+$-tree structure itself.

Some inodes can be used as directory entries; a directory entry type inode can include, for example, a type indicator (e.g., FIG. 8) that indicates the inode is a directory entry. A directory entry can store information (sometimes referred to as metadata) that describe the directories in the file system 106. Metadata can include, for example, the name of the directory (e.g., "Alice", "bob", and "BOB" shown in FIG. 1 are examples of directory names), dates (e.g., creation date, modification date, etc.), access permissions (e.g., read, write, etc.), number of files in the directory, and so on.

Figure 4:
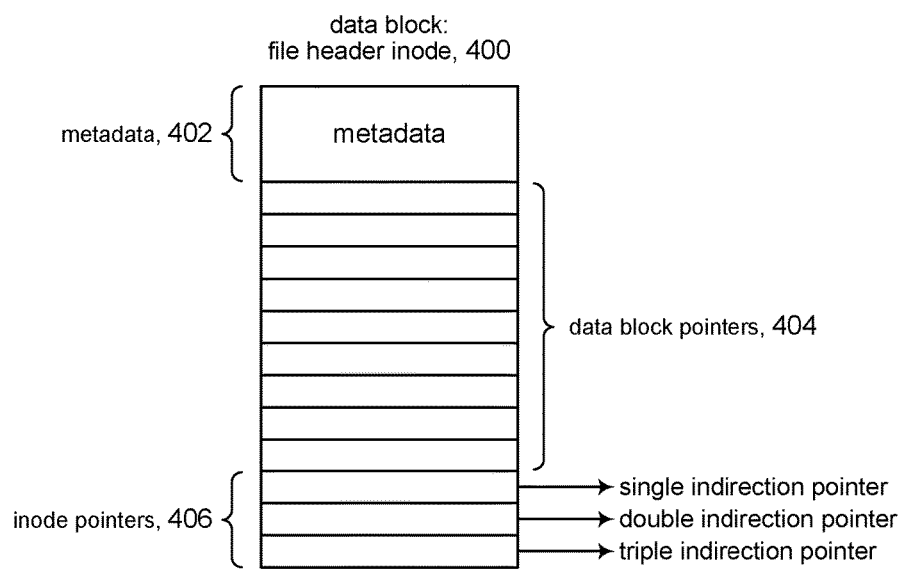
FIG. 4 depicts an inode configured to store data for a file header of the present disclosure.

Some inodes can be used for file headers; a file header type inode can include, for example, a type indicator (e.g., FIG. 8) that indicates the inode is a file header. Each file in the file system 106 can be associated with a file header inode. FIG. 4 shows an example of a file header inode 400. In some embodiments, the file header inode 400 can include a metadata portion 402 to store information about the associated file, such as name of the file, owner of the file, dates, access permissions, file size, and so on. The file header inode 400 can include portion 404 for data block pointers that point directly to data blocks that store the actual file data, namely the contents of the file. In some embodiments, the file header inode 400 can include nine data block pointers. The file header inode 400 can also include a set of indirection pointers 406. These point to inodes (sometimes referred to as indirection inodes) rather than data blocks, and those inodes contain pointers to data blocks. The use of indirection inodes can provide storage for large files beyond the capacity of the nine data blocks directly accessed by the data block pointers 404. As shown in FIG. 4, the indirection pointers 406 can include a "single" indirection pointer, that points to an inode which stores pointers to data blocks. A double indirection pointer points to an inode which stores pointers to an additional level of inodes (hence the double indirection), each of which store pointers to data blocks. A triple indirection pointer points to two additional levels of inodes before pointing to data blocks.

Figure 5:
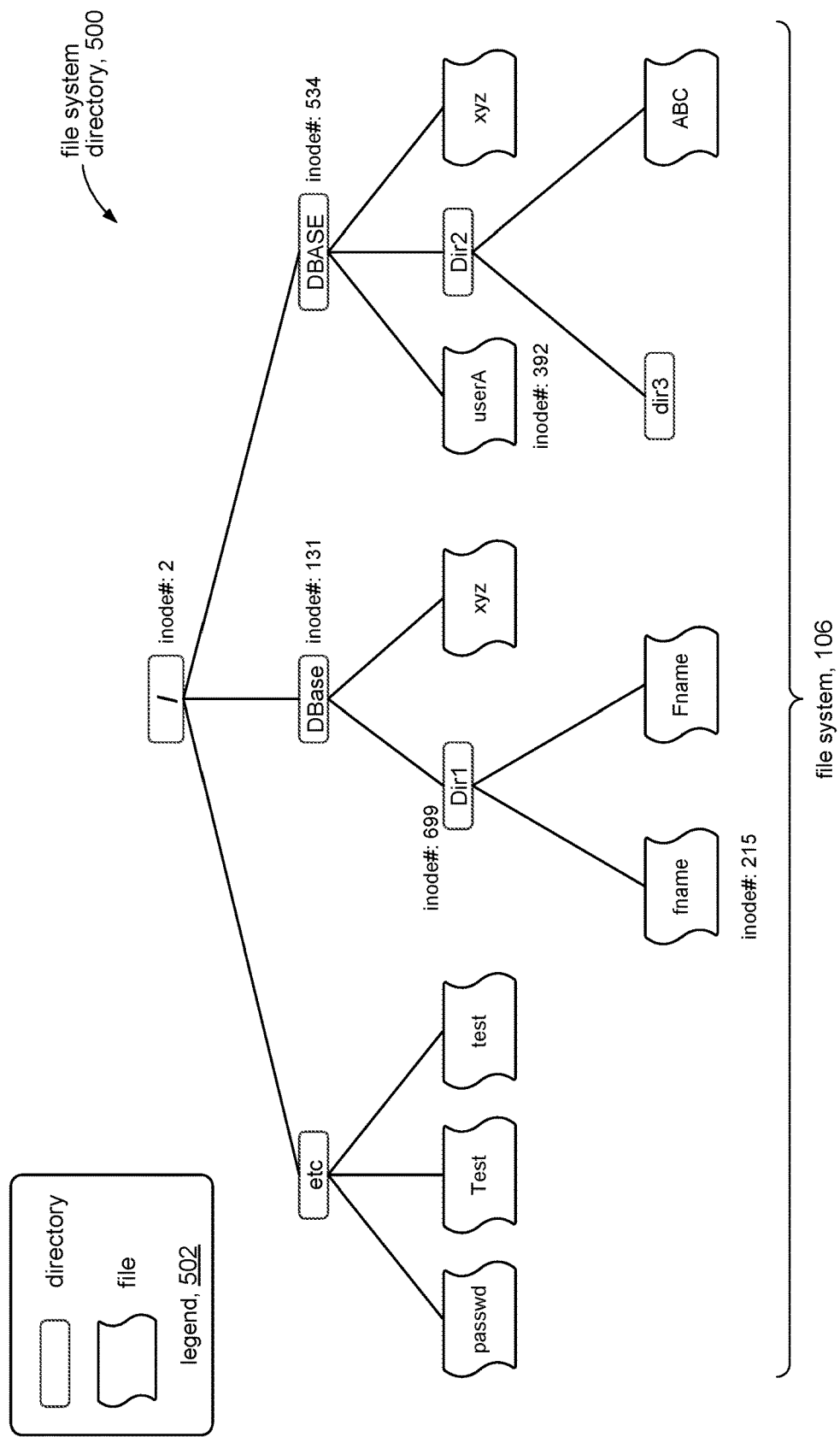
FIG. 5 shows a file system directory for an illustrative file system of the present disclosure.

FIG. 5 shows an example of a file system directory 500 for a file system 106. This example will be used to illustrate aspects of the present disclosure in the descriptions to follow. A legend 502 illustrates the notation to denote directories and files. The file system 106 shown in FIG. 5 stores directories and files in case sensitive manner. For example, the directory names DBase and DBASE are recognized as different directories. Likewise, fname and Fname in directory Dir1 are recognized as different files. The full pathname of a file or directory can be represented using the well recognized UNIX-style naming convention; e.g., /etc/passwd (for a file), /DBASE/Dir2/Dir3 (for a directory), and so on. Some of the file objects shown in FIG. 5 are annotated with inode numbers associated with the file object. In the case of a directory, the inode number would identify the inode of the directory entry for that directory, and in the case of a file, the inode number would identify the inode of the file header for that file. These inode numbers are referenced in the discussions to follow.

Figure 6:
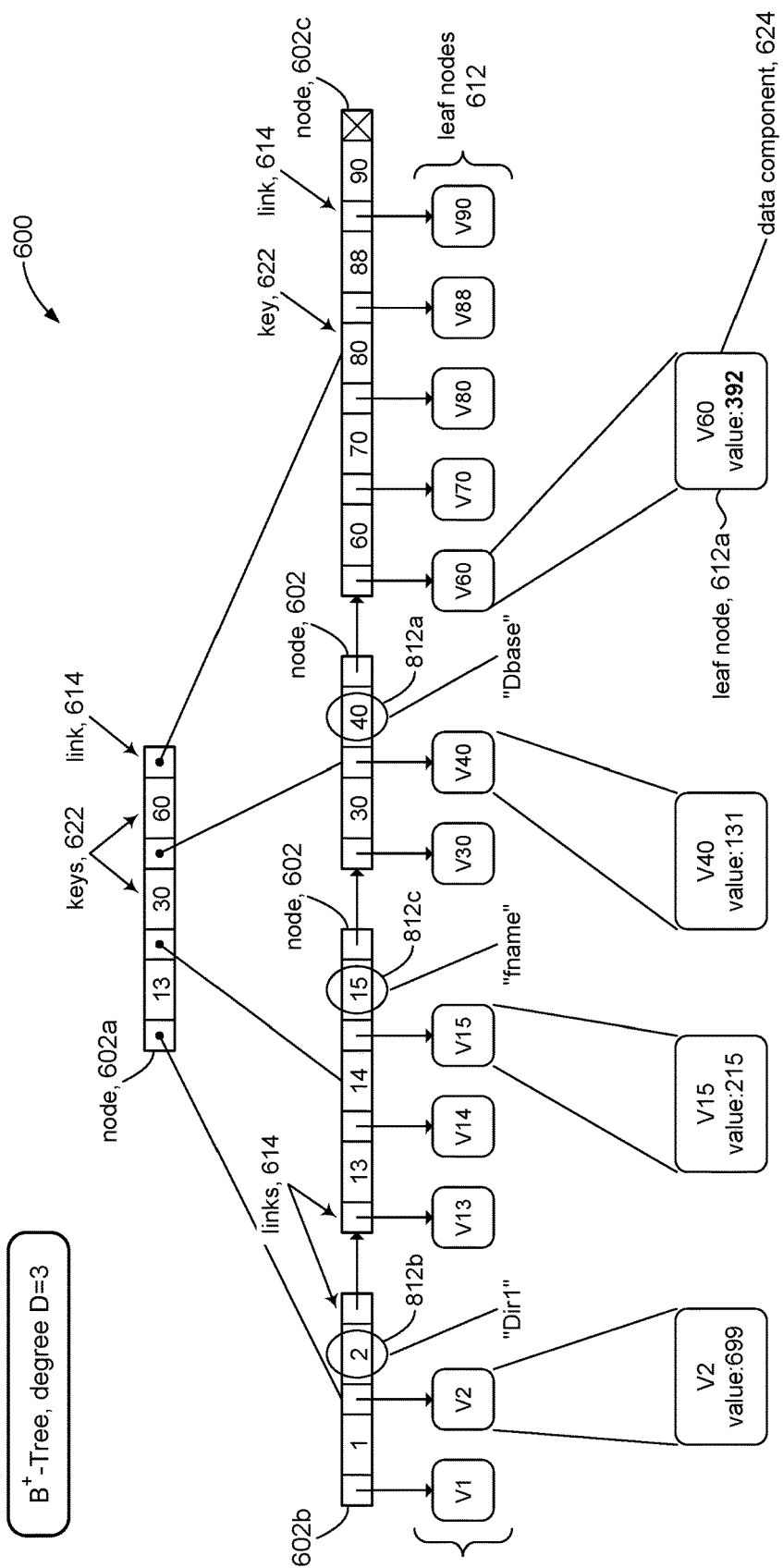
FIG. 6 depicts an example of a $B^+$-tree representation of a file system directory in accordance with aspects of the present disclosure.

FIG. 6 illustrates an example of the file system directory 500 represented by an implementation of a B$^+$-tree search tree 600, where the names of the directories and files are indexed in a B$^+$-tree and sorted according to a B-tree sorting order. The B$^+$-tree 600 comprises a hierarchy of internal (intermediate) nodes 602 and leaf nodes 612. Each internal node 602 includes keys only (no data) 622 and links 614 that point to child nodes (e.g., node 602*b* is a child node of 602*a*). The example shown in FIG. 6 is a B$^+$-tree 600 of degree D=3, although in other embodiments the degree D can be much higher; e.g., 32, 64, 128, etc. Various implementations of the B$^+$-tree data structure are well understood, and B-tree operations such as lookup, insertion, and deletion are well understood and well known. As will be explained below, the key 622 can be viewed as an index to the name of the directory or file. The key 622 can be used as a search key to search the B+-tree 600 to access the corresponding file object; for example, to do lookups, insertions, and so on that file object.

Data associated with keys 622 are contained the data components 624 in leaf nodes 612. Each leaf node 612 is depicted in FIG. 6 with its associated key 622. Node 602*b*, for example, includes a link 614 associated with key "1" that points to a leaf node 612 that is represented in the figure by "V1", which contains a data component 624 associated with key "1". Likewise, node 602*c* includes a link 614 associated with key "88" that points to a leaf node 612 that is represented in the figure by "V88", which contains a data component 624 associated with key "88". The data component 624 in each leaf node 612 is associated with a directory (e.g., directory "etc", FIG. 5) or a file (e.g., file "ABC", FIG. 5), and so B-tree operations such as lookup, insertion, and deletion are operations on the corresponding directory or file.

In some embodiments, the data component 624 in each leaf node 612 represents an inode associated with the file object that corresponds to the leaf node 612. The inode can include a piece of information (e.g., a bit setting, a byte setting) that identifies the inode as being a directory entry (if the inode is associated with a directory) or a file header (if the inode is associated with a file). Suppose, for example, the leaf node 612*a* corresponds to the file "userA" used in our example in FIG. 5. The data component 624 for leaf node 612*a* would contain the inode number of the file header for "userA", namely "392" as shown in FIG. 6.

When a file object is added to a file system 106, a key 622 is generated for the file object and used to identify an insertion point in the B+-tree 600 to insert a leaf node 612 corresponding to the file object. The generated key 622 is inserted into an internal node 602 in the B+-tree 600, and a leaf node 612 is created with a data component 624 that is initialized with the inode associated with the file object.

Referring now to FIGS. 7, 7A and 7B, details for a key 622 in accordance with the present disclosure are shown. For discussion purposes, the file "userA" shown in FIG. 5 will be used as an example to explain the various elements that comprise key 622 of a leaf node 612 associated with file "userA".

The key 622 can include a parent inode 702 that serves as a primary key. The parent inode 702 is the inode of the directory that contains the corresponding file object. In our example, the directory that contains the file "userA" is directory "DBASE", and so the parent inode 702 is "534" (the inode number of "DBASE", FIG. 5), as shown in the examples in FIGS. 7A and 7B.

In accordance with the present disclosure, the key 622 can include a first hash value 704 that serves as a secondary key. The first hash value 704 can be generated using any suitable hash function (e.g., hash1) such as crc32, crc64, SIP, SHA1, and so on. The input to the hash function can be a case-folded version of the name of the file object. The process of "case-folding" refers to mapping the case of each letter in a name in a pre-defined manner. In some embodiments, for example, case-folding can map all the letters in a name to lower case letters; in our example, case-folding "userA" can produce the case-folded name "users"; e.g. FIG. 7A. In other embodiments, case-folding can map all the letters in a name to upper case letters; thus for example, "userA" can be case-folded to "USERA" as shown in FIG. 7B. In some embodiments, case-folding may involving a mapping process that alternates between upper and lower case letters. For example "userA" can be case-folded to "uSeRa". Still other case-foldings can be imagined in various embodiments of the present disclosure. Since all names are case-folded in the same way, it can be said that the case-folded names are "case-neutral."

Continuing, the key 622 can include a second hash value 706 that serves as a tertiary key. The second hash value 706 can be generated using a hash function (e.g., hash2) that can be the same hash function (e.g. hash1) as used to generate the first hash value 704, or a different hash function. In accordance with the present disclosure, the input to the hash function can be the original (case preserved) version of the name of the file object, comprising the original upper and lower case of the letters. In our example, for instance, the input to the hash function to generate the second hash value 706 would be "userA".

The key 622 can include a collision index 708 to serve as a minor key. The collision index 708 can be used to disambiguate collisions when different file names hash to the same value. The collision index 708 serves to ensure that each key 622 is unique. In some embodiments, the collision index 708 can be an integer value (e.g., 64 bit value) that is used and incremented with each collision. Since the size of the key 622 is less than the size of the file name, it is possible that two different file names will generate the same hash value for both the case folded name and original name. For example, using the hash function is CRC32, both names "oxueekz" and "pyqptgs" produce the CRC hash value: 0x42EC27D5, which is a collision. When this happens, a different collision index is used so that the two file names have different keys.

The key 622 can be generated by concatenating its elements 702, 704, 706, 708. For example, merely to illustrate this point, assume the following data for our example file "userA":

parent inode 702: "534" (from FIG. 5)
first hash value 704: "4ad62e22f"
second hash value 706: "9a2a8cb3f"
collision index 708: "0000" (assume no collisions with the name "userA")

The resulting value for key 622 that is generated from the file name "userA" can look like (expressed in hexadecimal notation, for example):

"5344ad62e22f9a2a8cb3f0000".

For the sake of clarity, the keys 622 shown in FIG. 6 are only one- or two-digit numbers to avoid cluttering the figure with large numbers. It will be appreciated, however, that in various embodiments of the present disclosure, the keys 622 can be many more digits in length.

Figure 8:
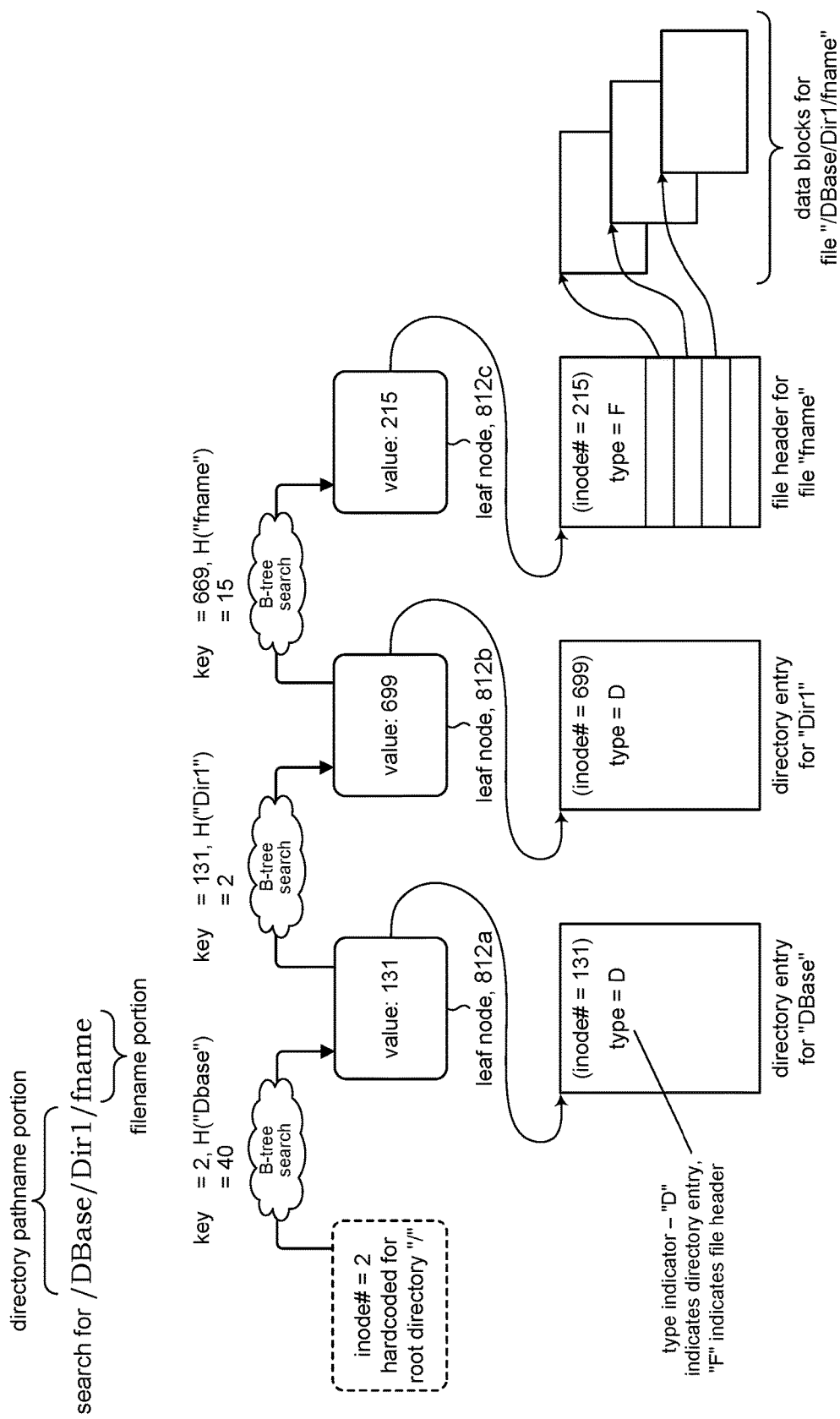
FIG. 8 shows an example of traversing a $B^+$-tree in accordance with the present disclosure.

Referring now to FIG. 8, and with reference to earlier figures, the discussion will turn to a high level description of traversing the B+-tree 600 in accordance with the present disclosure for a given pathname; e.g., to create a directory or a file, to do a lookup on a file object, to read/write attributes of a file object, and so on. The pathname for a file, for example, comprises a directory pathname portion which is the pathname of the directory that contains the file, and a filename portion which is the name of the file itself. A traversal of the pathname "/DBase/Dir1/fname" will be used in connection with FIG. 5 as an example to illustrate the following discussion. The directory pathname portion is "/DBase/Dir1" and the filename portion is "fname". FIG. 5 shows inode numbers for the directories and the file referenced in the example.

Traversal of the directory pathname portion can start from the root (/) directory, and proceed one directory at a time. At each directory, confirmation is made before proceeding to the next director; e.g., whether the directory exists, whether there is sufficient permission to proceed, and so on. Traversal generally involves searching the B+-tree 600 to access the leaf node 612 associated with each directory, which includes generating a key 622 as described above, searching the B+-tree 600 using key 622 to find the leaf node 612, and accessing the inode specified in the found leaf node. This is repeated for each directory in the directory pathname portion.

Using the given example, traversal of directory pathname "/DBase/Dir1" starts with name of the first directory "DBase". The key 622 for "DBase" is generated as explained above in connection with FIG. 7. The inode for the root directory is the parent inode 702. The inode for the root directory can be established at the time of creation of file system 106 on storage volume 104. In some embodiments, for example, the root inode is inode number 2 as shown in FIG. 5. A hash on a case-neutral version of "DBase" (e.g., "dbase") is computed to produce the first hash value 704. A hash of "DBase" (the original case-preserved version of the name) is computed to produce the second hash value 706. When inserting a new key, the process checks whether there is a collision of key hash, and if there is, it will scan to find an unused index. If there is no collision, collision index will be set to 0.

For explanation purposes, suppose the key 622 for directory "DBase" computes out to the value 50. The B+-tree 600 can be searched using "40" as the search key to find leaf node 812a. The data component 624 of the found leaf node 812a identifies the inode associated with directory "DBase". In our example, the data component 624 of leaf node 812a is "131". Inode 131 can be accessed from storage volume 104 and information stored in the inode can be used to verify that DBase is a directory (e.g., by checking a type indicator in the inode), allows read access, and so on, before traversing the next directory.

Traversal can continue with the next name in the directory pathname, namely "Dir1". The key 622 for "Dir1" can be generated using the inode for directory "DBase" (i.e., 131) as the parent inode 702, performing a hash of a case-neutral version of "Dir1" (e.g., "dir1") to produce the first hash value 704, and performing a hash of "Dir1" to produce the second hash value 706. Suppose the computation of key 622 for directory "Dir1" results in the value "2". The B+-tree 600 can be searched using "2" as the search key to find leaf node 812b. The data component 624 of the found leaf node 812b identifies the inode associated with directory "Dir1", namely inode number 699. At this point, directory traversal can be deemed complete because "Dir1" is the last name in the directory pathname.

Traversal can continue with the filename portion of the pathname, which in our example is "fname". As with the directories, the key 622 for fname can be computed using the inode for directory "Dir1" (i.e., 699) as the parent inode 702, performing a hash of a case-neutral version of "fname" (which is "fname") to produce the first hash value 704, and performing a hash of "fname" to produce the second hash value 706. Suppose the computation results in the value "15". The B+-tree 600 can be searched using "15" as the search key to find leaf node 812c, which contains a data component 624 that specifies inode number 215. The inode can be accessed from the storage volume 104, and the data pointers can be used to access the data blocks for file fname.

Figure 9:
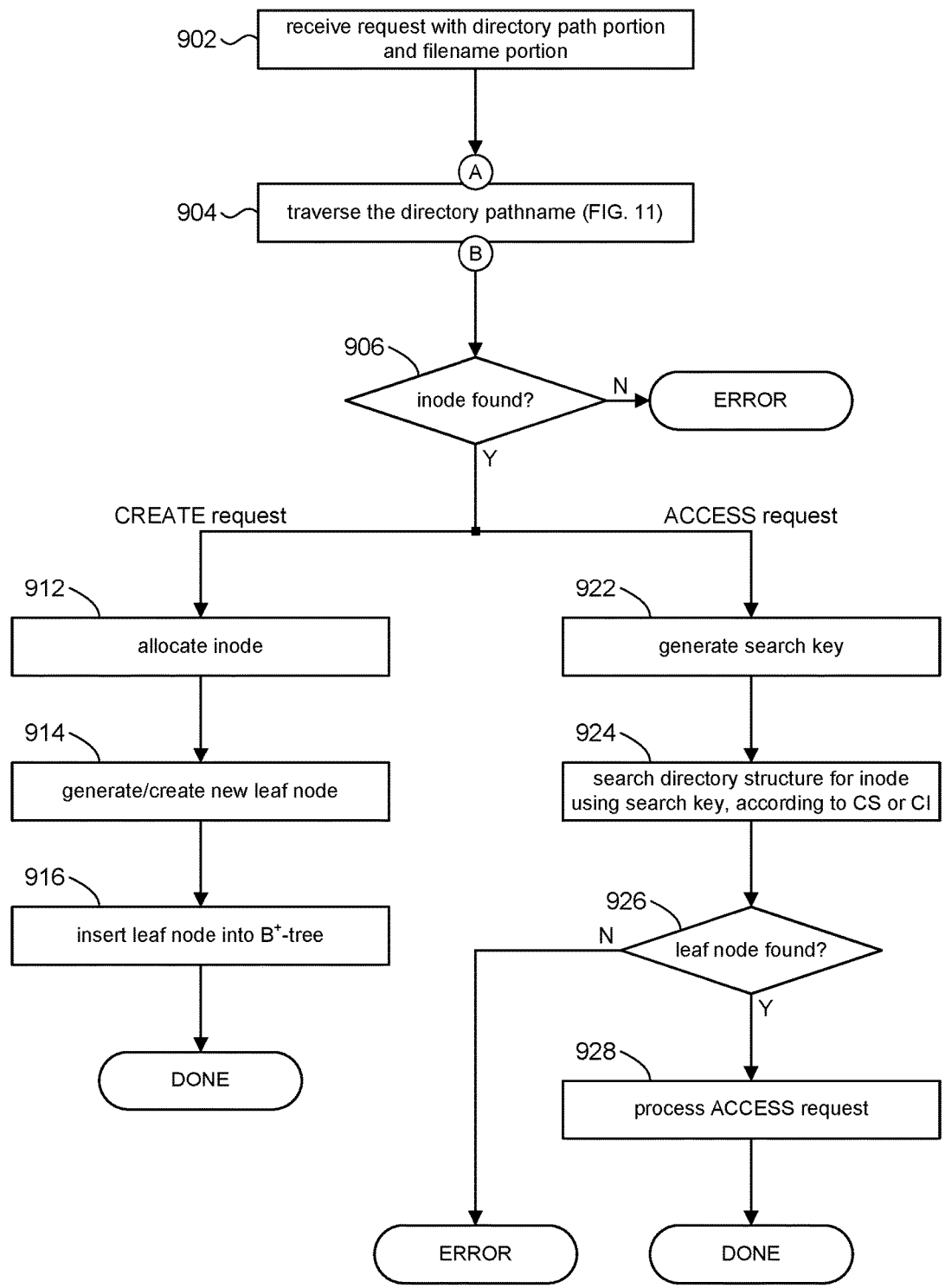
FIG. 9 illustrates operations for processing a request in accordance with the present disclosure.

Referring to FIG. 9 and other figures, the discussion will now turn to a description of operations and processing by the file server 102 to process files stored and accessed in accordance with the present disclosure. In some embodiments, for example, the file server 102 can include computer executable program code, which when executed by their respective processors (e.g., 202, FIG. 2), can cause the file server 102 to perform processing in accordance with FIG. 9. The operation and processing blocks described below are not necessarily executed in the order shown, and can be allocated for execution among one ore more concurrently executing processes and/or threads.

At block 902, the file server 102 can receive a request (e.g., from a user 10 of a requesting client system 12) to process a file in file system 106. The request can specify a full pathname of the file or directory that is the target of the request. As mentioned above, the full pathname for a file can comprise a directory pathname portion and a filename portion. In the case of a request that targets a directory, the full pathname (e.g., "/DBASE/Dir2/dir3") can be apportioned in similar fashion, where the pathname up to but not including the target directory (e.g., "/DBASE/Dir2") can be considered the directory pathname portion and the final component in the pathname (e.g., "dir3") can be considered the filename portion.

At block 904, the file server 102 can traverse the directory pathname portion of the pathname provided in the received request. The traversal can generally proceed as discussed above in connection with FIG. 8, and as will be discussed with additional details in FIG. 11. When traversal completes, processing can continue to block 906.

At block 906, the file server 102 can make a determination whether traversal of the directory pathname portion of the pathname provided in the received request succeeded or not. For example, if one of the directories in the directory pathname portion does not exist, this can be deemed to be an error. As another example, if the user 10 does not have proper access permissions or authorization to access one of the directories in the directory pathname portion, this can be deemed to be an error, and so on. In response to an error condition, processing can terminate and the file server 102 can exit with a suitable return code or perform some signaling that indicates an error condition.

If, on the other hand, traversal of the directory pathname portion was successful, then the file server 102 can be provided with the inode of the directory entry of the last directory specified in the directory pathname portion. For example, if the directory pathname portion is "/DBASE/Dir2" then the inode number of the directory entry for directory "Dir2" (the last directory) can be provided to the file server 102; this aspect of the present disclosure is explained in connection with FIG. 11. In response to a successful traversal of the directory pathname portion, processing of the received request can continue at block 912 (create file object) or at block 922 (access file object), depending on the nature of the request (block 902). The discussion will first describe processing down block 912, followed by a description of processing down block 922.

Figure 10:
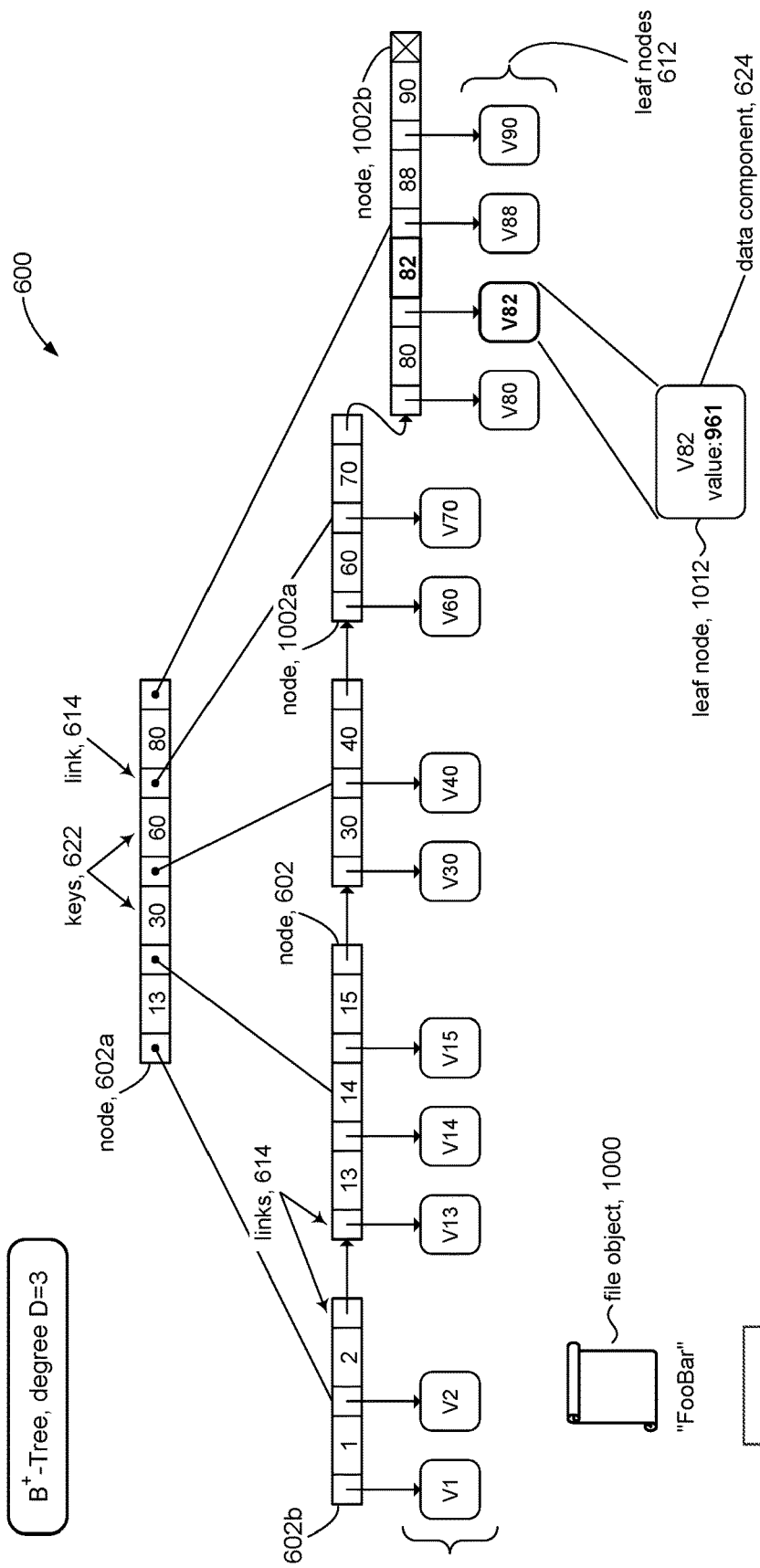
FIG. 10 illustrates insertion into a $B^+$-tree in accordance with the present disclosure.

At block 912 and referring to FIG. 10, the file server 102 can create a file object 1000 (namely, a directory or a file) in response to the received request being a CREATE request. In some embodiments, for example, the file server 102 can allocate an inode 1020 for a directory entry or a file header, depending on the file object, and initialize metadata in the allocated inode with information such as the name of the file object (e.g., "FooBar"), creation date, owner, access rights, and so on.

At block 914, the file server 102 can create a leaf node 1012 corresponding to the file object to be inserted into the B+-tree 600. The data component 624 of the new leaf node 1012 is the inode number of the allocated inode 1020, namely 961. As for the key component 622, the file server 102 can compute the key 622 for the new leaf node 1012, as explained above in connection with FIG. 7, using the inode number (block 904) that corresponds to the parent directory of the file object (this is the parent inode 702 component of the key 622), a hash of the case-folded name (e.g., "foobar") of the file object (this is the first hash value 704 component of the key 622), and a hash of the case-preserved name (e.g., "FooBar") of the file object (this is the second hash value 706 component of the key 622). The file server 102 can update and incorporate the collision index 708 in the case of a hash collision. Assume for discussion purposes the value computed for the key 622 is "82".

At block 916, the file server 102 can insert the created leaf node 1012 into the B$^+$-tree 600. The file server 102, for example, can use the generated key 622 to search the B$^+$-tree 600 for the insertion point to insert the created leaf node 1012. FIG. 10 shows how the B$^+$-tree 600 shown in FIG. 6 can change after insertion of the leaf node 1012 (with key 622="82") into the B$^+$-tree. Insertion can proceed in accordance with various known and well understood insertion rules for B-trees. For example, the previous node 602c (FIG. 6) can be split into nodes 1002a, 1002b, and the leaf nodes in previous node 602c redistributed among nodes 602a, 1002a, 1002b. With respect to the present disclosure, processing of the CREATE request can be deemed complete.

It can be appreciated that indexing a directory or file name in the foregoing manner, using keys 622, encodes the both the case-neutral versions and case-preserved (original) versions of the name. As will now be explained, such indexing allows for subsequent case sensitive and case insensitive lookups.

The discussion will now turn to a description of processing down block 922, with reference to FIGS. 6 and 7. The file server 102 can access a file object (namely, a directory or a file) in response the received request being an ACCESS request. An ACCESS request can include a request to read (or write) data from (or to) a file. An ACCESS request can include a request that reads or writes the metadata of a directory or file; e.g., readdir, stat, link, linkat, rename, etc.

At block 922, the file server 102 can generate a search key to search for the leaf node 612 (FIG. 6) associated with the file object that is the target of the ACCESS request. The file server 102, for example, can compute a value for the search key using the inode number, determined at block 904, that corresponds to the parent directory of the file object (this is the parent inode 702 component of the key), a hash of the case-folded name of the file object (this is the first hash value 704 component of the key), and a hash of the case-preserved version of the name of the file object (this is the second hash value 706 component of the key in the manner described above in connection with FIG. 7. The file server 102 can add the previously determined collision index 708 to complete the search key.

At block 924, the file server 102 can search the B$^+$-tree 600 (which represents the directory structure of the file system 106) using the search key generated for the target file object. In accordance with the present disclosure, the ACCESS request can indicate whether the file object is treated in (1) a case sensitive manner (i.e., use a case sensitive lookup) or (2) a case insensitive manner (i.e., use a case insensitive lookup).

1. Case Sensitive Lookup

If the ACCESS request specifies a case sensitive lookup of the target file object, the file server 102 can perform a "point value" lookup or search in the B$^+$-tree 600 using the generated search key. More particularly, the file server 102 can limit the point value search to leaf nodes 612 that are associated with file objects that are similar in kind to the target file object. For example, if the target file object is a directory, then the point value lookup should only consider leaf nodes 612 that are associated with directory entries. Likewise, if the target file object is a file, then the point value lookup will only consider leaf nodes 612 that are associated with file headers.

A point value lookup means using the generated search key to find a leaf node 612 whose key component 622 matches exactly the generated search key. More specifically, a point value lookup looks for an exact match between the first and second hash values 704, 706 that comprise the generated search key and the first and second hash values 704, 706 that comprise the key component 622. Finding an exact match between the key component 622 in a leaf node 612 and the generated search key means that the name of the file object in the file system matches case-wise with the name specified in the ACCESS request; in other words, both names comprise the same combination of upper case and lower case letters.

2. Case Insensitive Lookup

On the other hand, if the ACCESS request specifies a case insensitive lookup of the target file object, the file server 102 can perform a "ranged" lookup or search in the B$^+$-tree 600 using the search key generated for the file object. In accordance with the present disclosure, a ranged lookup means searching the B$^+$-tree with a range of search keys based on the generated search key. In some embodiments, the generated search key can be modified to generate a pair of ranged search keys. Merely for the purpose of explaining the idea of a ranged lookup, assume the following search key $KEY_{generated}$ has been produced for the target file object (reference FIG. 7):

$KEY_{generated}$: <38, 123def, 456abc, 296> where 38 is the inode of the parent directory that contains the file object,

123def is the hash value of the case-neutral version of the name of the file object, 456abc is the hash value of the case-preserved version of the name of the file object, 296 is a previously determined collision id.

The file server 102 can modify the above-generated search key $KEY_{generated}$ to produce the to following pair of ranged (min and max) search keys:

$KEY_{lower}$: <38, 123def, 0, 0>

$KEY_{upper}$: <38, 123def, MaxHashValue, MaxCollisionIndex> where the hash value of the case-preserved version of the name of the file object and the collision index have been replaced with respective minimum (e.g., "0") and maximum values.

These ranged keys $KEY_{lower}$, $KEY_{upper}$ can be used to traverse the B$^+$-tree to visit nodes 602, and leaf nodes 612 within the nodes 602, that fall within the min and max range, inclusive. As explained above, the file server 102 can limit the ranged lookup to leaf nodes 612 that are associated with file objects similar in kind to the target file object. If only one leaf node 612 occurs within the range, that means there is only one file object of the given kind that matches the target file object in the directory corresponding to inode 38. This can be deemed a valid outcome for a case insensitive lookup, where the directory contains only on occurrence of the file object irrespective the case of the name.

If, on the other hand, more than one leaf node 612 occurs within the range, that means the directory corresponding to inode 38 contains two or more file objects (directory or file) that have the same name but with different cases. This is an invalid outcome for an ACCESS request that specifies a case insensitive lookup, because a name such as "FooBar" is considered to be the same as the name "foobar" in the case insensitive context. Therefore, the presence of a file named "FooBar" and a file named "foobar" in the same directory represents an unacceptable ambiguity in the case insensitive context, and thus constitutes an error condition.

In some embodiments, the ambiguity of a case insensitive lookup resulting in multiple leaf nodes 612 can be avoided by failing a create operation in the first place (CREATE request at block 912). When creating a new file or directory (file object) with a name N in a directory, a case insensitive lookup of the name N can first be performed. If the case insensitive lookup finds the name N, then the CREATE request can fail; and if the case insensitive lookup does not the name N, then the CREATE request can proceed to create the file object with name N. In this way, the directory will contain only one file with the name N, irrespective of case. This guarantees that the directory can be compatible with both case insensitive and case sensitive lookups later, and is useful if the same directory needs to be supported by case insensitive and case sensitive at the same time (e.g., exported by both NFS and SMB protocols).

At block 926, the file server 102 can terminate with an ERROR signal or return code in response to an error condition. An error condition can arise if a search of the B+-tree 600 using the generated search key did not result in finding a leaf node 612. This situation can occur whether the ACCESS request is case sensitive or case insensitive. In the case of a case insensitive lookup, an error condition can also arise if more than one leaf node 612 was found for a given name (in the same directory), as explained above in connection with block 924. The file server 102 can proceed to block 928 in response to a leaf node 612 being found.

At block 928, the file server 102 can process the ACCESS request. The specific processing will depend on the particular access being requested. For example, a request to open ( ) a file can cause the file server 102 to return a handle to the file, which can then be used in subsequent read( ) and/or write( ) requests. A stat( ) request on a file or directory can cause the file server 102 to read out metadata (e.g., owner information, last modified time, size, etc.) from the directory entry or file header. A chown( ) request on a file or directory can cause the file server 102 to change the metadata, in this case the owner can be changed. A delete( ) request can cause the file server 102 to delete the specified file object, and so on.

It can be appreciated from the foregoing that a file system directory that indexes the names of its directories and files in accordance with the present disclosure can be used to provide both case sensitive and case insensitive lookups of those directories and files.

Figure 11:
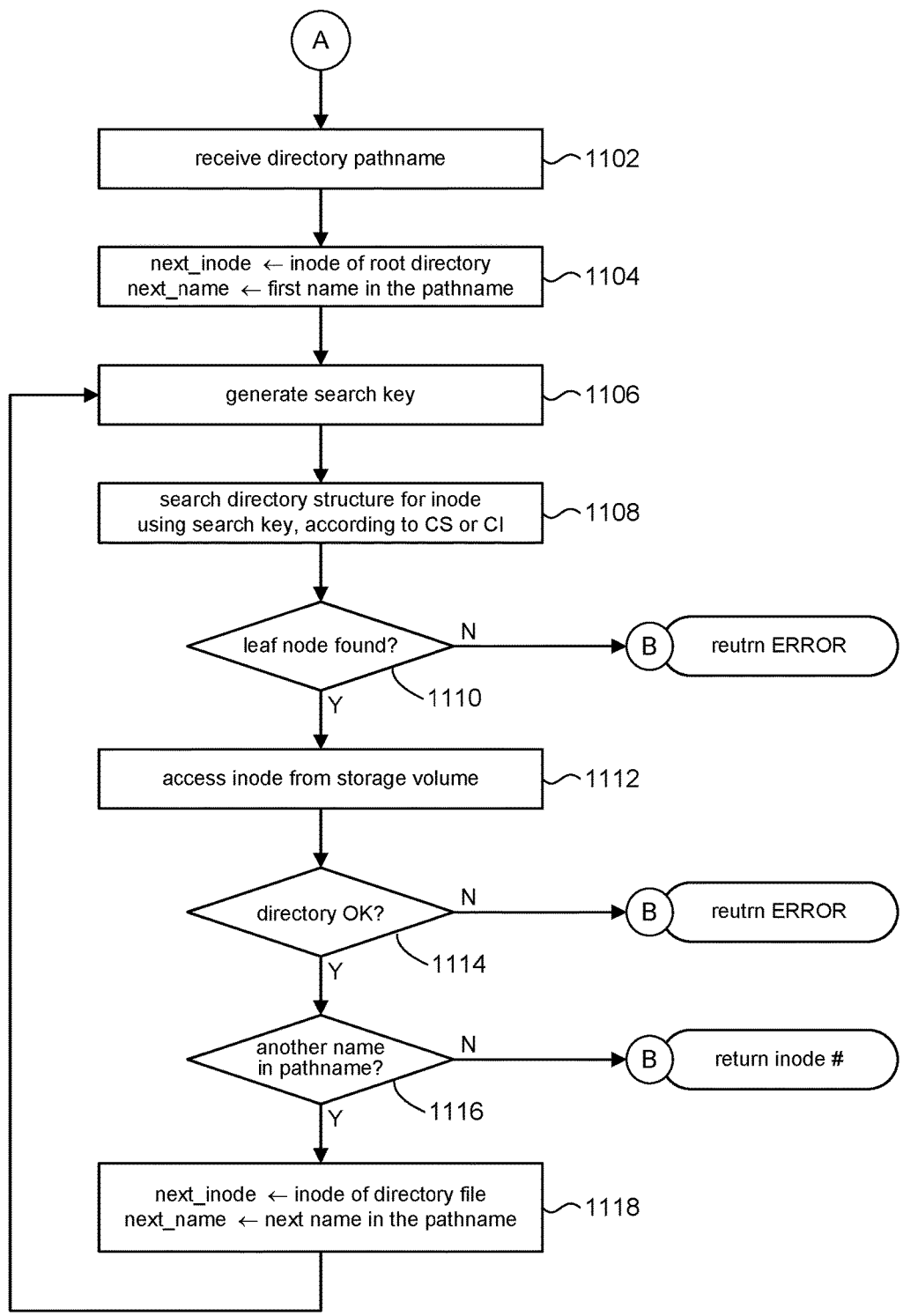
FIG. 11 illustrates operations for traversing a $B^+$-tree in accordance with the present disclosure.

Referring to FIG. 11 and other figures, the discussion will now turn to a description of operations and processing by the file server 102 to traverse the B+-tree 600 in accordance with the present disclosure, adding some detail to the processing described in connection with FIG. 8. In some embodiments, for example, the file server 102 can include computer executable program code, which when executed by their respective processors (e.g., 202, FIG. 2), can cause the file server 102 to perform processing in accordance with FIG. 11. The operation and processing blocks described below are not necessarily executed in the order shown, and can be allocated for execution among one ore more concurrently executing processes and/or threads. The entry point A and exit point B shown in FIG. 11 are referred to in FIG. 9.

At block 1102, the file server 102 can receive a directory pathname to be traversed.

At block 1104, the file server 102 can initialize some internal data. As noted above in connection with FIG. 8, traversal of the directory pathname can start from the root directory ("/"). In some embodiments, the file server 102 can initialize some internal data; for example, a data structure called next_inode can be initialized with the inode for the root directory, and another data structure called next_name can be initialized with the first directory name in the directory pathname.

At block 1106, the file server 102 can generate a search key as explained above in connection with block 922 in FIG. 9, using next_inode as the parent inode 702 (FIG. 7) and hashing the case-neutral and case-preserved versions of next_name.

At block 1108, the file server 102 can perform a lookup or search of the B+-tree 600 using the generated search key in the manner describe above in connection with block 924 to find a leaf node 612, keeping in mind whether the lookup is case sensitive or case insensitive.

At block 1110, the file server 102 can terminate with an ERROR signal or return code in response to the lookup failing to find a leaf node 612 that "matches" the search key generated at block 1106. In the case of a case sensitive lookup, for example, a match occurs when there is an exact match with the search key and the key component 622 in a leaf node 612, and in particular when there is an exact match between the first and second hash values 704, 706 that comprise the generated search key and the first and second hash values 704, 706 that comprise the key component 622. In the case of a case insensitive lookup, a match occurs if there is only one leaf node 612 in the ranged lookup (block 924). The file server 102 can proceed to block 1112 in response to finding a leaf node 612.

At block 1112, the file server 102 can access the inode identified by the data component 624 of the leaf node 612 found in block 1108.

At block 1114, the file server 102 can terminate with an ERROR signal or return code in response to an error condition with the accessed inode. For example, if the accessed inode indicates that it is a file header, that can constitute an error condition since only directories are expected in the directory pathname (received at block 1102). Another error condition can arise when access permissions for the directory do not allow the directory to be traversed, and so on. The file server 102 can continue to block 1114 if an error condition has not arisen.

At block 1116, the file server 102 can terminate processing in response to determining that there are no more names in the directory path. In some embodiments, for example, the file server 102 can return the inode number in the data component 624 of the leaf node 612 found in block 1108 (i.e., the inode associated with the last directory referenced in the directory pathname).

At block 1118, n response to determining that the directory pathname has another name, the file server 102 can set the next_inode data structure to the data component 624 of the leaf node 612 found at block 1108, and store the next name in the directory pathname into the next_name data structure. The file server 102 can repeat the process from block 1106.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a file system on a storage volume having stored thereon directories and files with names comprising upper case letters and lower case letters, the method comprising:
   receiving, by a computer in communication with the storage volume, a request comprising a file name that identifies a file targeted by the request, wherein the request includes an indication of whether to treat the file name as a case sensitive name or as a case insensitive name;
   generating, by the computer, a search key that comprises both a representation of a case-folded version of the file name and a representation of the file name with its case preserved, including computing a first hash value on the case-folded version of the file name and computing a second hash value on the file name with its case preserved, the generated search key comprising a combination of the first hash value and the second hash value;
   searching, by the computer, a sorted index of the directories and files of the file system using the generated search key to access the file, wherein the sorted index is configured for case sensitive searches and case insensitive searches; and
   performing, by the computer, an action on the accessed file specified in the request, including either or both: reading or writing data to or from the accessed file; and reading or writing attributes of the accessed file.

2. The method of claim 1, wherein searching the sorted index includes: performing a search operation of a first kind on the sorted index using the generated search key when the request treats the file name as a case sensitive name; and performing a search operation of a second kind on the sorted index using the generated search key when the request treats the file name as a case insensitive name.

3. The method of claim 2, wherein the search operation of the first kind includes searching the sorted index for an exact match between hash value portions of the generated search key and hash value portions of an index in the sorted index, wherein the second kind of search operation includes searching the sorted index for a range of indices, wherein the range of indices is determined from the generated search key.

4. The method of claim 3, further comprising producing a min search key and a max search key from the generated search key, wherein the min search key and the max search key specify the range of indices.

5. The method of claim 4, wherein the hash value portions of a search key comprise a first hash value on the case-folded version of the file name and a second hash value on the file name with its case preserved, wherein the min search key comprises the value zero ("0") for its second hash value, wherein the max search key comprises a maximum value of its second hash value.

6. The method of claim 1, wherein the generated search key further comprises a combination of an inode number of a parent directory of the file in addition to the combination of the first hash value and the second hash value.

7. The method of claim 1, wherein the request is a create operation to create a file object with name N in a directory, wherein the create operation fails when the directory contains a file object having a case insensitive version of the name N.

8. A non-transitory computer-readable storage medium having stored thereon computer executable instructions, which when executed by a computer device, cause the computer device to provide access to a file system, including causing the computer device to:
   receive a request comprising a file name that identifies a file targeted by the request, wherein the request includes an indication of whether to treat the file name as a case sensitive name or as a case insensitive name;
   generate a search key that comprises both a representation of a case-folded version of the file name and a representation of the file name with its case preserved, including computing a first hash value on the case-folded version of the file name and computing a second hash value on the file name with its case preserved, the generated search key comprising a combination of the first hash value and the second hash value;
   search a sorted index of directories and files comprising the file system using the generated search key to access the file, irrespective of whether the request treats the file name as a case sensitive name or a case insensitive name; and
   perform an action on the accessed file, including either or both:
      reading or writing data to or from the accessed file; and
      reading or writing attributes of the accessed file.

9. The non-transitory computer-readable storage medium of claim 8, wherein searching the sorted index includes: performing a search operation of a first kind on the sorted index using the generated search key when the request treats the file name as a case sensitive name; and performing a search operation of a second kind on the sorted index using the generated search key when the request treats the file name as a case insensitive name.

10. The non-transitory computer-readable storage medium of claim 9, wherein the search operation of the first kind includes searching the sorted index for an exact match between hash value portions of the generated search key and hash value portions of an index in the sorted index, wherein the second kind of search operation includes searching the sorted index for a range of indices, wherein the range of indices is determined from the generated search key.

11. The non-transitory computer-readable storage medium of claim 10, wherein the computer executable instructions, which when executed by the computer device, further cause the computer device to produce a min search key and a max search key from the generated search key, wherein the min search key and the max search key specify the range of indices.

12. The non-transitory computer-readable storage medium of claim 8, wherein the request is a create operation to create a file object with name N in a directory, wherein the create operation fails when the directory contains a file object having a case insensitive version of the name N.

13. An apparatus in a file system, the apparatus comprising:
one or more computer processors; and
a computer-readable storage medium comprising instructions for controlling the one or more computer processors to be operable to:
receive a request comprising a file name that identifies a file targeted by the request, wherein the request includes an indication of whether to treat the file name as a case sensitive name or as a case insensitive name;
generate a search key that comprises both a representation of a case-folded version of the file name and a representation of the file name with its case preserved, including computing a first hash value on the case-folded version of the file name and computing a second hash value on the file name with its case preserved, the generated search key comprising a combination of the first hash value and the second hash value;
search a sorted index of directories and files comprising the file system using the generated search key to access the file, irrespective of whether the request treats the file name as a case sensitive name or a case insensitive name; and
perform an action on the accessed file, including either or both:
reading or writing data to or from the accessed file; and
reading or writing attributes of the accessed file.

14. The apparatus of claim 13, wherein searching the sorted index includes: performing a search operation of a first kind on the sorted index using the generated search key when the request treats the file name as a case sensitive name; and performing a search operation of a second kind on the sorted index using the generated search key when the request treats the file name as a case insensitive name.

15. The apparatus of claim 14, wherein the search operation of the first kind includes searching the sorted index for an exact match between hash values that comprise the generated search key and hash values that comprise an index in the sorted index, wherein the second kind of search operation includes searching the sorted index for a range of indices, wherein the range of indices is determined from the generated search key.

16. The apparatus of claim 15, wherein the computer-readable storage medium further comprises instructions for controlling the one or more computer processors to be operable to produce a min search key and a max search key from the generated search key, wherein the min search key and the max search key specify the range of indices.

17. The apparatus of claim 13, wherein the file system is a case sensitive file system and exposes a POSIX API, wherein the computer-readable storage medium further comprises instructions for controlling the one or more computer processors to process a request that treats the file name as a case insensitive file name on the case sensitive file system by:
invoking a getxattr( )function call defined by the POSIX API using an extended attribute name with a predefined pattern which includes the case insensitive file name;
receiving from the getxattr( )function call a case sensitive version of the file name; and
accessing the file using the case sensitive version of the file name.

* * * * *